United States Patent
Hendriks et al.

(10) Patent No.: US 12,351,012 B2
(45) Date of Patent: Jul. 8, 2025

(54) ENERGY STORAGE COMPARTMENT

(71) Applicant: Volvo Truck Corporation, Gothenburg (SE)

(72) Inventors: Jan Hendriks, Västra Frölunda (SE); Viktor Karlsson, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 888 days.

(21) Appl. No.: 17/540,398

(22) Filed: Dec. 2, 2021

(65) Prior Publication Data
US 2022/0185089 A1  Jun. 16, 2022

(30) Foreign Application Priority Data
Dec. 11, 2020 (EP) .................................... 20213440

(51) Int. Cl.
*B60K 1/04* (2019.01)
*B60K 15/03* (2006.01)
(Continued)

(52) U.S. Cl.
CPC .............. *B60K 1/04* (2013.01); *B60K 15/063* (2013.01); *B62D 21/02* (2013.01);
(Continued)

(58) Field of Classification Search
CPC ............ H01M 50/249; H01M 50/244; H01M 8/04201; B60K 1/04; B60K 15/063; B62D 21/02
See application file for complete search history.

(56) References Cited

U.S. PATENT DOCUMENTS

| 10,493,837 | B1 | 12/2019 | Angelo et al. |
| 10,525,824 | B2 | 1/2020 | Kataoka et al. |
| 2006/0113131 | A1* | 6/2006 | Kato ................. B62D 25/2036 |
| | | | 429/434 |

FOREIGN PATENT DOCUMENTS

| CN | 104802860 A | 7/2015 |
| CN | 110497783 A | 11/2019 |

(Continued)

OTHER PUBLICATIONS

Extended European Search Report for European Patent Application No. 20213440.9, mailed Feb. 26, 2021, 7 pages.
(Continued)

*Primary Examiner* — Karie O'Neill Apicella
(74) *Attorney, Agent, or Firm* — Withrow & Terranova, PLLC

(57) ABSTRACT

The present disclosure relates to an energy storage compartment connectable between a pair of longitudinally extending frame rails of a heavy-duty vehicle, the energy storage compartment being arranged to house an energy storage system configured to supply energy to a prime mover of the vehicle for propulsion of the prime mover, wherein the energy storage compartment comprises longitudinally extending portions forming an encircling load absorbing module, the longitudinally extending portions comprising a pair of longitudinally extending side wall portions connectable to the pair of longitudinally extending frame rails, a longitudinally extending floor portion and a longitudinally extending roof portion, wherein the longitudinally extending portions of the encircling load absorbing module are arranged and configured to, when being subject to a load from the longitudinally extending frame rails, absorb the transversal component of the load.

14 Claims, 3 Drawing Sheets

(51) Int. Cl.
*B60K 15/063* (2006.01)
*B60L 50/60* (2019.01)
*B60L 50/70* (2019.01)
*B62D 21/02* (2006.01)
*H01M 8/04082* (2016.01)
*H01M 16/00* (2006.01)
*H01M 50/244* (2021.01)
*H01M 50/249* (2021.01)

(52) U.S. Cl.
CPC ..... *H01M 8/04201* (2013.01); *H01M 16/006* (2013.01); *H01M 50/244* (2021.01); *H01M 50/249* (2021.01); *B60K 2001/0405* (2013.01); *B60K 2015/03315* (2013.01); *B60K 2015/0636* (2013.01); *B60L 50/60* (2019.02); *B60L 50/70* (2019.02); *H01M 2220/20* (2013.01); *H01M 2250/20* (2013.01)

(56) References Cited

FOREIGN PATENT DOCUMENTS

| | | | |
|---|---|---|---|
| DE | 102010045705 A1 | 7/2011 |
| DE | 102018121223 A1 | 3/2020 |
| DE | 102018121227 A1 | 3/2020 |
| DE | 102020000493 A1 | 9/2020 |
| EP | 3496966 A1 | 6/2019 |
| JP | 2019189169 A | 10/2019 |
| WO | 2018030931 A1 | 2/2018 |

OTHER PUBLICATIONS

First Office Action for Chinese Patent Application No. 202111478966.2, mailed Dec. 11, 2024, 16 pages.

* cited by examiner

ENERGY STORAGE COMPARTMENT

RELATED APPLICATIONS

The present application claims priority to European Patent Application No. 20213440.9, filed on Dec. 11, 2020, and entitled "ENERGY STORAGE COMPARTMENT," which is incorporated herein by reference in its entirety.

TECHNICAL FIELD

The present disclosure relates to an energy storage compartment connectable between a pair of longitudinally extending frame rails of a vehicle, and a vehicle frame arrangement comprising such an energy storage compartment. Although the energy storage compartment will mainly be described in relation to a heavy-duty vehicle in the form of a truck, it may also be applicable for other types of vehicles comprising such longitudinally extending frame rails.

BACKGROUND

The propulsion systems of vehicles are continuously developed to meet the demands from the market. A particular aspect relates to the emission of environmentally harmful exhaust gas. Therefore, vehicles propelled by electric machines or hydrogen fuel cells have been increasingly popular, in particular for trucks and other heavy duty vehicles.

The battery or hydrogen fuel tank connected to the propulsion system of the vehicle need to be relatively large to be able to deliver a substantial amount of power to the electric machine(s)/fuel cell(s), in particular when aiming for covering a long driving range without having to re-charge/re-fuel.

A conventional placement of these energy storage systems, i.e. the batteries/hydrogen fuel tanks, in a heavy duty vehicle is along the longitudinally extending frame rails of the vehicle. This is substantially the same position as used for the conventional diesel tanks of a truck using an internal combustion engine for propulsion. However, positioning the heavy batteries/hydrogen fuel tanks at this position exposes the frame and connecting brackets to high stress, whereby a plurality of brackets is needed to safely suspend the energy storage system. Also, this position is vulnerable to damage of the energy storage system during operation of the vehicle. Further development is thus desirable to overcome at least these aspects.

SUMMARY

It is an object of the present disclosure to describe an energy storage compartment which at least partially overcomes the above described deficiencies. This is achieved by an energy storage compartment.

According to a first aspect, there is provided an energy storage compartment connectable between a pair of longitudinally extending frame rails of a heavy-duty vehicle, the energy storage compartment being arranged to house an energy storage system configured to supply energy to a prime mover of the vehicle for propulsion of the prime mover, wherein the energy storage compartment comprises longitudinally extending portions forming an encircling load absorbing module, the longitudinally extending portions comprising a pair of longitudinally extending side wall portions connectable to the pair of longitudinally extending frame rails, a longitudinally extending floor portion and a longitudinally extending roof portion, wherein the longitudinally extending portions of the encircling load absorbing module are arranged and configured to, when being subject to a load from the longitudinally extending frame rails, absorb the transversal component of the load.

The wording "longitudinally extending" should be construed as portions having their major extension longitudinally. Thus, a thickness of a transversely extending component should not be construed as longitudinally extending according to the above definition. The longitudinal extension should also be construed as a direction when the energy storage compartment is connected to the vehicle, i.e. alongside the longitudinally extending frame rails of the vehicle.

Furthermore, the encircling load absorbing module should be construed as encircling as seen in a cross-section which is substantially perpendicular to the longitudinal extension of the energy storage compartment. The encircling load absorbing module should not be construed as necessarily having a circular shape. Conversely, the encircling load absorbing module may be arranged in different shapes, as will be evident with reference to the various embodiments described below, as long as the side wall portions, the floor portion and the roof portion together form a continuous, and circumferentially arranged housing for the energy storage system.

The present disclosure is based on the insight that by providing an energy storage compartment which can be arranged between the pair of longitudinally extending frame rails of the heavy-duty vehicle, the energy storage system arranged within the encircling load absorbing module is well protected from e.g. side collisions that might occur during operation of the vehicle. Also, the otherwise unoccupied space between the longitudinally extending frame rails can be efficiently utilized. Still further, compared to the position transversely outside the longitudinally extending frame rails, the space between the longitudinally extending frame rails enables for a larger volume for positioning an energy storage system. Hereby, larger energy storage systems can be provided to the vehicle, whereby the driving range can be increased.

More importantly, as the longitudinally extending portions of the encircling load absorbing module are arranged and configured to absorb loads, the energy storage compartment, when connected between the longitudinally extending frame rails, provides an improved stiffness whereby the need for separate transversely arranged stiffeners between the longitudinally extending frame rails. Hence, the energy storage compartment contributes to an additional torsional and bending stiffness for the longitudinally extending frame rails.

According to an example embodiment, the encircling load absorbing module may be free from transversal, non-longitudinally extending load absorbing structures. As indicated above, the encircling load absorbing module is arranged to absorb loads, whereby transversal, non-longitudinally extending load absorbing structures can be omitted which is advantageous from e.g. a cost perspective. A further advantage of omitting the transversal, non-longitudinally extending load absorbing structures is that the energy storage compartment can contain energy storage systems which have a longer extension in the longitudinal direction. When transversal, non-longitudinally extending load absorbing structures are arranged between the longitudinally extending frame rails, the energy storage system needs to be split up in several, smaller energy storage systems. Such smaller energy storage systems will be able to contain less available energy for propulsion of the prime mover. The larger energy storage system occupying the larger space when omitting the transversal, non-longitudinally extending load absorbing structures thus enables for a larger driving range for the vehicle.

A transversal, non-longitudinally extending load absorbing module should be understood as a module absorbing loads from the longitudinally extending frame rails. Thus, a mere lid arranged at the end portions of the load absorbing module should not be construed as falling within the meaning of the wording transversal, non-longitudinally extending load absorbing module.

According to a further example embodiment, the encircling load absorbing module may be free from transversal, non-longitudinally extending load absorbing structures along the longitudinal length of the energy storage compartment.

According to an example embodiment, the floor portion may, when the energy storage compartment is connected between the pair of longitudinally extending frame rails, extend transversally from one of the longitudinally extending frame rails to the other one of the longitudinally extending frame rails. The floor portion may preferably also be attached to the longitudinally extending frame rails. Hereby, floor portion effectively absorbs the transversal component of the loads exposed to the longitudinally extending frame rails during operation of the vehicle.

According to an example embodiment, the roof portion may comprise a horizontal roof section and a pair of inclined roof sections, each inclined roof section extending between the horizontal roof section and a respective one of the side wall portions.

An advantage of the inclined portions is that the stiffness of the encircling load absorbing module is increased. This is due to the fact that the inclined portions act as a framework directing transversal loads in a transverse and vertical direction.

According to an example embodiment, the side wall portions may be arranged to be connected to a vertically lower end portion of the longitudinally extending frame rails, respectively.

Hereby, the vertically upper end portion of the longitudinally extending frame rails can be arranged to connect to other vehicle auxiliaries which are connected transversely outside the longitudinally extending frames, such as e.g. further vehicle batteries, etc. Accordingly, connecting the side wall portions to the vertically lower end portions creates additional space at the vertically upper end portions of the longitudinally extending frame rails.

According to an example embodiment, the roof portion may, when the energy storage compartment is connected between the pair of longitudinally extending frame rails, extend transversally from one of the longitudinally extending frame rails to the other one of the longitudinally extending frame rails.

Hereby, the energy storage compartment can be arranged in a substantially rectangular, or quadratic shape, which enables for an optimization of the space arranged therein. Hence, the space within the energy storage compartment can contain an optimized number of energy storage systems, or an energy storage system of increased size.

According to an example embodiment, the longitudinal extending portions may be arranged to extend between a front and a rear wheelbase position of the vehicle when the energy storage system is connected between the pair of longitudinally extending frame rails. Hereby, an energy storage system of substantial size/length can be arranged within the encircling load absorbing module.

According to an example embodiment, the encircling load absorbing module may house at least one longitudinally extending energy storage shelf arranged parallel, and vertically above, the floor portion. Hereby, energy storage systems can be arranged on top of each other within the encircling load absorbing module.

According to an example embodiment, the at least one longitudinally extending energy storage shelf may further extend between the pair of longitudinally extending side wall portions.

According to a second aspect, there is provided a vehicle frame arrangement for a heavy-duty vehicle, the vehicle frame arrangement comprising a pair of longitudinally extending frame rails, and an energy storage compartment according to any one of the embodiments described above in relation to the first aspect, wherein the side wall portions of the energy storage compartment is connected to the pair of longitudinally extending frame rails.

According to an example embodiment, the energy storage compartment may comprise a front end portion and a rear end portion, the longitudinal portions extend between the front and rear end portions.

According to an example embodiment, the energy storage compartment may comprise an energy storage system for supply of energy to a prime mover of the vehicle.

According to an example embodiment, the energy storage system may extend undisruptedly between the front and rear end portions of the energy storage compartment.

Hereby, and as indicated above, an energy storage system of substantial size/length can be arranged within the encircling load absorbing module.

According to an example embodiment, the energy storage system may comprise at least one vehicle battery. According to an example embodiment, the energy storage system comprises at least one hydrogen tank.

Further effects and features of the second aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
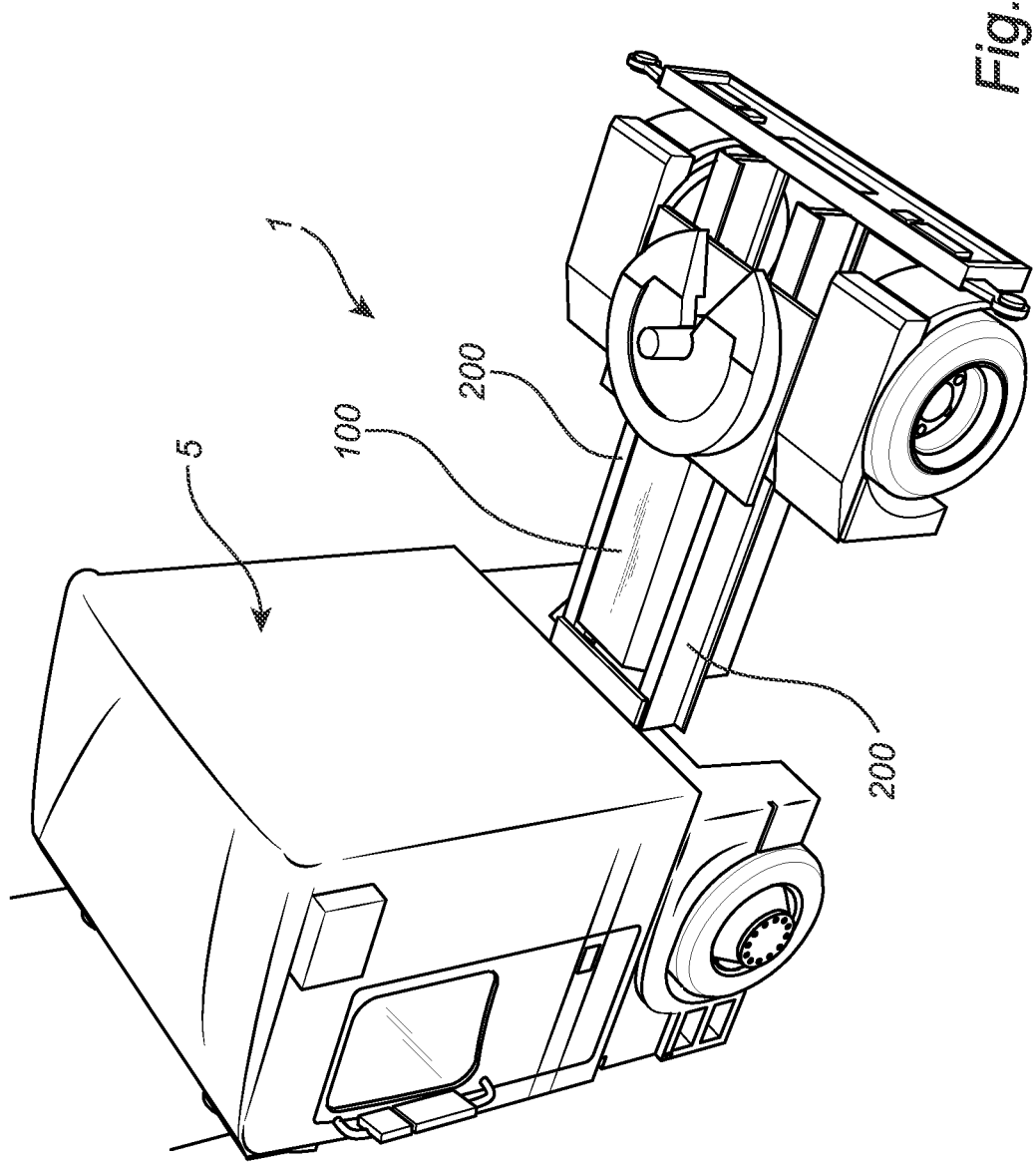
FIG. 1 is a lateral side view illustrating a heavy-duty vehicle in the form of a truck according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 is a perspective view of a vehicle 1 in the form of a truck. The vehicle comprises a cab 5 in which a driver controls operation of the vehicle. The vehicle is preferably propelled by means of one or more electric motors which receives electric power from one or more batteries or one or more fuel cells. The following will describe the vehicle 1 the form of a fuel cell truck which comprises one or more hydrogen tanks arranged to contain hydrogen for operating the fuel cell(s). The vehicle may also, in addition or as an alternative, comprise one or more vehicle batteries.

As is further illustrated in FIG. 1, the vehicle 1 comprises a pair of longitudinally extending frame rails 200 and an energy storage compartment 100 arranged between the pair of longitudinally extending frame rails 200 as seen in the transversal direction of the longitudinal extension of the vehicle 1.

Figure 2:
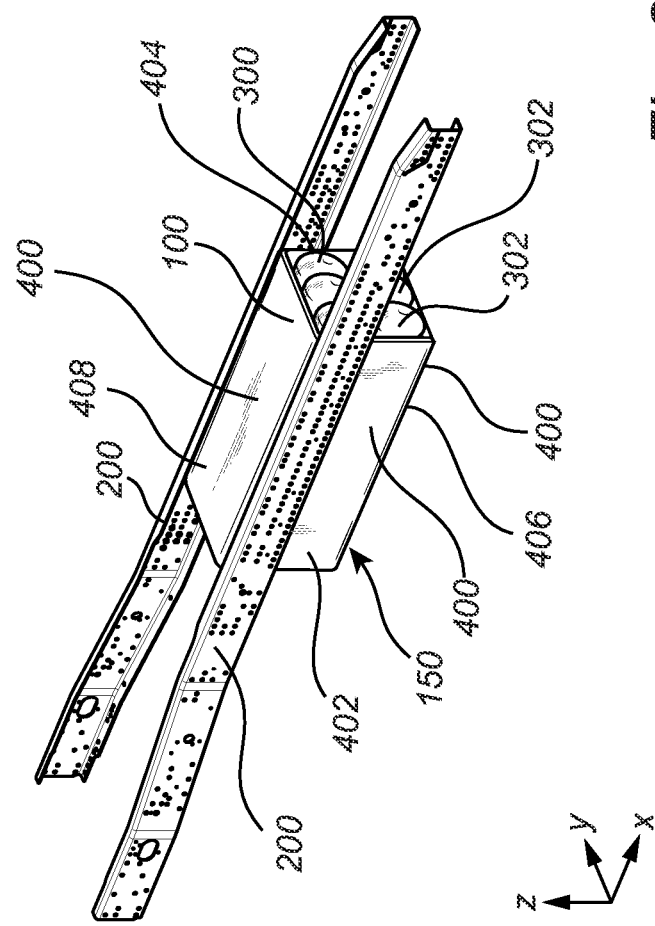
FIG. 2 is a perspective view illustrating the longitudinally extending frame rails and an energy storage compartment according to an example embodiment.

With reference to FIG. 2, which is a further detailed perspective view illustrating the longitudinally extending frame rails 200 and the energy storage compartment 100 according to an example embodiment. As described above, the energy storage compartment 100 is arranged laterally between the frame rails 200, i.e. arranged between the longitudinally extending frame rails 200 as seen in the transversal direction Y. As can be further observed in FIG. 2, the energy storage compartment 100 houses an energy storage system 300. The energy storage system 300 comprises in FIG. 2, as well as in the following description of FIGS. 3 and 4, a plurality of hydrogen tanks 302. The hydrogen tanks 302 contains hydrogen for supply to a fuel cell arranged to generate electricity which is supplied to an electric motor (not shown).

As can be seen in FIG. 2, the energy storage compartment 100 comprises longitudinal portions 400 extending in the longitudinal direction X of the vehicle 1. The longitudinal portions 400 may extend between a front and a rear wheelbase (not shown) of the vehicle and are preferably free from non-longitudinally extending load absorbing structures. By not using e.g. transversally arranged load absorbing structures, the hydrogen tanks 302 positioned within the energy storage compartment 100 can have substantially the same length as the length of the longitudinal portions 400 of the energy storage compartment 100, i.e. extend undisruptedly between front and rear end portions of the energy storage compartment. Furthermore, and as will be described in further detail below, the longitudinally extending portions 400 together form an encircling load absorbing module 150. The longitudinally extending portions 400 comprises a pair of longitudinally extending side wall portions 402, 404 connected to the pair of longitudinally extending frame rails 200, a longitudinally extending floor portion 406 and a longitudinally extending roof portion 408, whereby the longitudinally extending portions 400 form an encircling load absorbing module 150. The longitudinally extending portions 400 of the encircling load absorbing module 150 are arranged and configured to absorb transversal loads exposed to the longitudinally extending frame rails 200 during operation of the vehicle. Accordingly, the load is absorbed by the longitudinally extending portions 400 instead of using e.g. transversally extending load absorbing structures.

Figure 3:
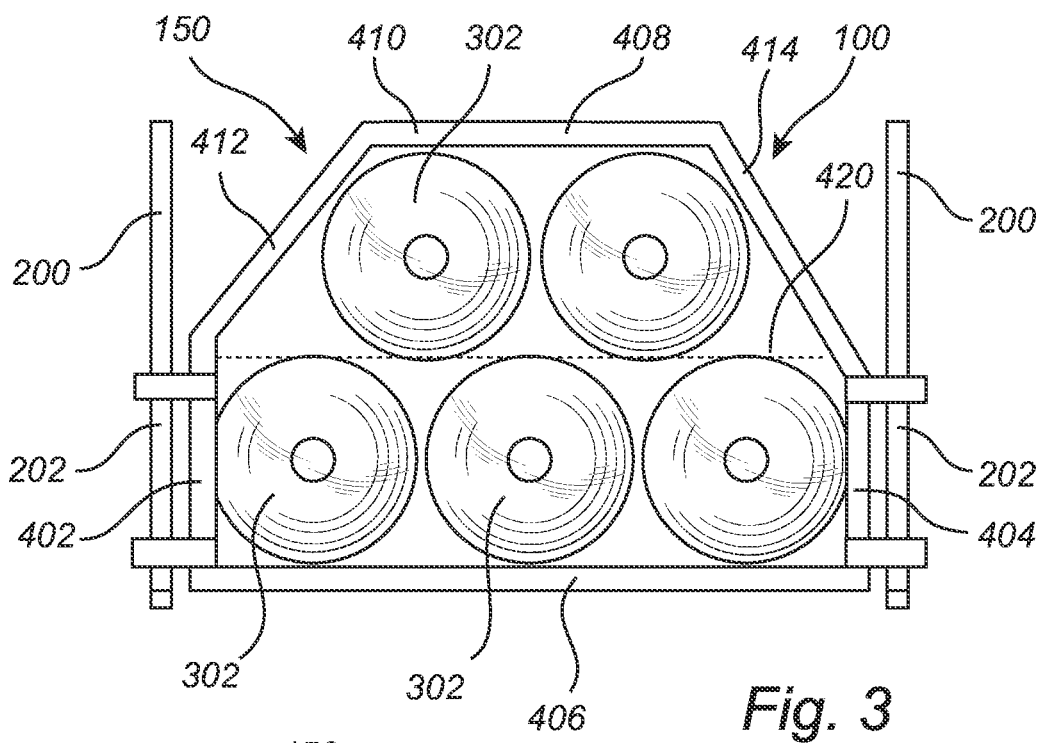
FIG. 3 is a cross-sectional view of the energy storage compartment in FIG. 2 according to an example embodiment.
Figure 4:
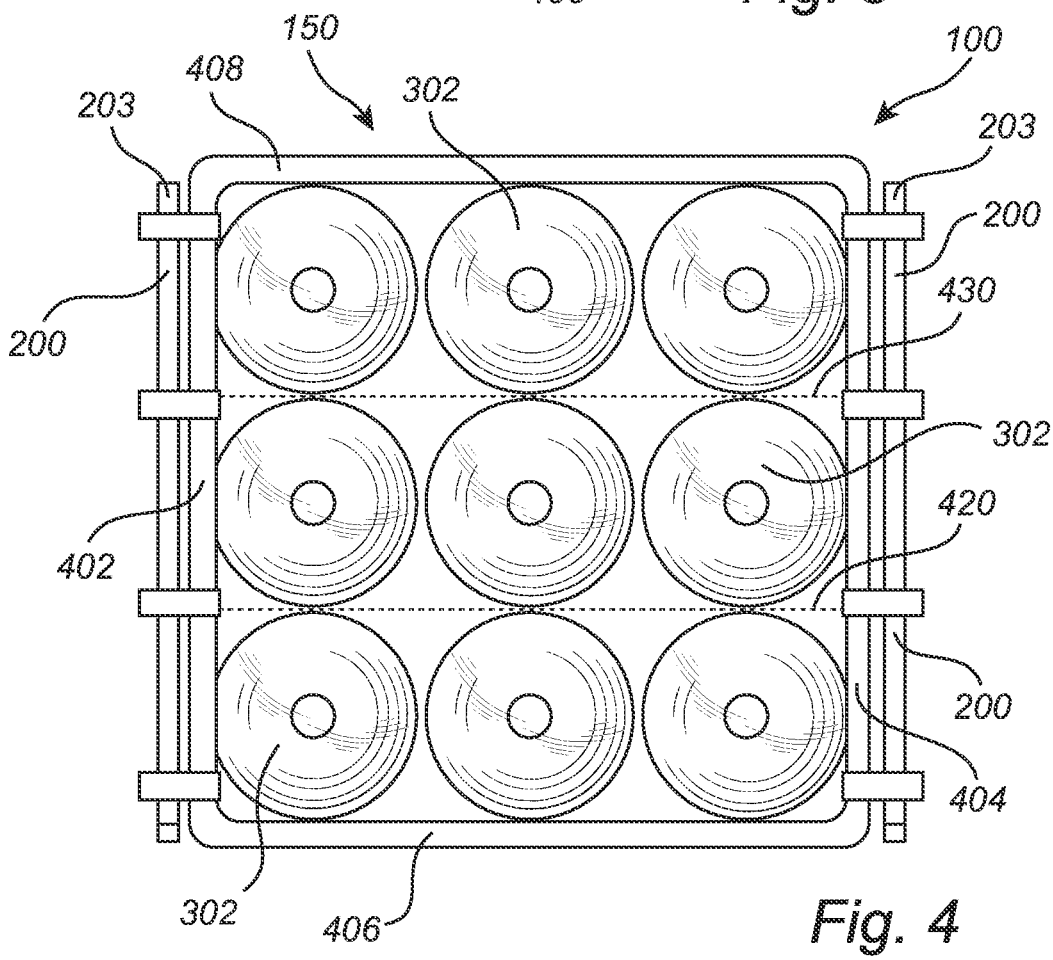
FIG. 4 is a cross-sectional view of the energy storage compartment in FIG. 2 according to another example embodiment.

In order to describe the energy storage compartment 100 in further detail, reference is made to FIGS. 3 and 4 which illustrate a respective example embodiment of the energy storage compartment 300.

Starting with FIG. 3, which is a cross-sectional view of the energy storage compartment 100 in FIG. 2 according to a first example embodiment. The energy storage compartment 100 comprises, as indicated above, a pair of side wall portions 402, 404 connected to the pair of longitudinally extending frame rails 200, a longitudinally extending floor portion 406 and a longitudinally extending roof portion 408, wherein the side wall portions, the floor portion and the roof portion form the encircling load absorbing module 150.

In the embodiment depicted in FIG. 3, the roof portion 408 comprises a horizontal roof section 410, a first inclined roof section 412 and a second inclined roof section 414. The first inclined roof section 412 extends between a first one of the side wall portions 402 and the horizontal roof section 410, while the second inclined roof section 414 extends between a second one of the side wall portions 404 and the horizontal roof section 410. The floor portion 406 extends transversally between the frame rails 200, while the horizontal roof section 410 extends between end portions of the inclined roof sections, a distance from the respective frame rails.

Further, the energy storage compartment 100 is connected to the longitudinally extending frame rails at a lower end portion 202 of the longitudinally extending frame rails 200 using a suitable connecting arrangement. Also, with the configuration depicted in FIG. 3, at least two layers of longitudinally extending hydrogen tanks 302 can be positioned within energy storage compartment 100. However, further layer of longitudinally extending hydrogen tanks 302 are also conceivable depending on the size of the tanks. Moreover, each layer of longitudinally extending hydrogen tanks 302 may be separated by means of providing a longitudinally extending energy storage shelf 420 within the energy storage compartment 100. The energy storage shelf 420 is thus, as depicted, arranged vertically between the floor portion 406 and the roof portion 408.

Turning now to FIG. 4 which is a cross-sectional view of the energy storage compartment 100 in FIG. 2 according to a second example embodiment. In a similar vein as the embodiment depicted in FIG. 3, the energy storage compartment 100 comprises a pair of side wall portions 402, 404 connected to the pair of longitudinally extending frame rails 200, a longitudinally extending floor portion 406 and a longitudinally extending roof portion 408, wherein the side wall portions, the floor portion and the roof portion form the encircling load absorbing module 150.

The main difference between the embodiment depicted in FIG. 3 and the embodiment depicted in FIG. 4 is that the energy storage compartment 100 in FIG. 4 is arranged as a quadratic energy storage compartment 100, i.e. the height of the side wall portions 402, 404 are substantially the same as the width of the roof portion 408 and the floor portion 406. Hereby, both the roof portion 408 as well as the floor portion 406 extends transversally between the longitudinally extending frame rails 200. The energy storage compartment 100 may also be arranged in a rectangular shape where, for example, the height of the side wall portions is larger than the width of the roof portion 408 and the floor portion 406.

Furthermore, the energy storage compartment 100 is connected to the longitudinally extending frame rails at an upper end portion 203 of the longitudinally extending frame rails 200 using a suitable connecting arrangement.

Also, the configuration depicted in FIG. 2 comprises three layers of longitudinally extending hydrogen tanks 302 positioned within energy storage compartment 100. However, further layer of longitudinally extending hydrogen tanks 302 are also conceivable depending on the size of the tanks. Moreover, the embodiment depicted in FIG. 4 comprises an additional longitudinally extending energy storage shelf 430. The additional longitudinally extending energy storage shelf 430 is thus positioned vertically above the first longitudinally extending energy storage shelf 420, whereby the three layers are physically disconnected from each other.

It is to be understood that the present disclosure is not limited to the embodiments described above and illustrated in the drawings; rather, the skilled person will recognize that many changes and modifications may be made within the scope of the appended claims.

The invention claimed is:

1. An energy storage compartment, comprising:
longitudinally extending portions forming an encircling load absorbing module, the longitudinally extending portions comprising:
a pair of longitudinally extending side wall portions connectable to a pair of longitudinally extending frame rails of a vehicle,
a longitudinally extending floor portion, and
a longitudinally extending roof portion,
wherein the energy storage compartment is arranged to house an energy storage system configured to supply energy to a prime mover of the vehicle for propulsion of the prime mover,
wherein the energy storage compartment is configured to connect between the pair of longitudinally extending frame rails of the vehicle, and
wherein the encircling load absorbing module is free from transversal, non-longitudinally extending load absorbing structures such that the longitudinally extending portions of the encircling load absorbing module are arranged and configured to, when being subject to a load from the pair of longitudinally extending frame rails, absorb a transversal component of the load.

2. The energy storage compartment of claim 1, wherein the longitudinally extending floor portion, when the energy storage compartment is connected between the pair of longitudinally extending frame rails, extends transversally from one frame rail of the pair of longitudinally extending frame rails to the other one frame rail of the pair of longitudinally extending frame rails.

3. The energy storage compartment of claim 1, wherein the longitudinally extending roof portion comprises a horizontal roof section and a pair of inclined roof sections, each inclined roof section extending between the horizontal roof section and a respective one of the longitudinally extending side wall portions.

4. The energy storage compartment of claim 3, wherein the longitudinally extending side wall portions are arranged to be connected to a vertically lower end portion of the pair of longitudinally extending frame rails.

5. The energy storage compartment of claim 1, wherein the longitudinally extending roof portion, when the energy storage compartment is connected between the pair of longitudinally extending frame rails, extends transversally from one frame rail of the pair of longitudinally extending frame rails to the other one frame rail of the pair of longitudinally extending frame rails.

6. The energy storage compartment of claim 1, wherein the longitudinal extending portions are arranged to extend between a front wheelbase position and a rear wheelbase position of the vehicle when the energy storage system is connected between the pair of longitudinally extending frame rails.

7. The energy storage compartment of claim 1, wherein the encircling load absorbing module houses at least one longitudinally extending energy storage shelf arranged parallel to, and vertically above, the longitudinally extending floor portion.

8. The energy storage compartment of claim 7, wherein the at least one longitudinally extending energy storage shelf further extends between the pair of longitudinally extending side wall portions.

9. A vehicle frame arrangement for a heavy-duty vehicle, comprising:
a pair of longitudinally extending frame rails, and
an energy storage compartment, comprising:
longitudinally extending portions forming an encircling load absorbing module, the longitudinally extending portions comprising:
a pair of longitudinally extending side wall portions connectable to the pair of longitudinally extending frame rails,
a longitudinally extending floor portion and
a longitudinally extending roof portion,
wherein the energy storage compartment is arranged to house an energy storage system configured to supply energy to a prime mover of the heavy-duty vehicle for propulsion of the prime mover,
wherein the longitudinally extending side wall portions of the energy storage compartment are connected to the pair of longitudinally extending frame rails, and
wherein the encircling load absorbing module is free from transversal, non-longitudinally extending load absorbing structures such that the longitudinally extending portions of the encircling load absorbing module are arranged and configured to, when being subject to a load from the pair of longitudinally extending frame rails, absorb a transversal component of the load.

10. The vehicle frame arrangement of claim 9, wherein the energy storage compartment comprises a front end portion and a rear end portion, the longitudinally extending portions extending between the front end portion and the rear end portion.

11. The vehicle frame arrangement of claim 9, wherein the energy storage compartment comprises the energy storage system for supply of energy to the prime mover of the heavy-duty vehicle.

12. The vehicle frame arrangement of claim 10, wherein the energy storage system extends uninterrupted between the front end portion and the rear end portion of the energy storage compartment.

13. The vehicle frame arrangement of claim 11, wherein the energy storage system comprises at least one vehicle battery.

14. The vehicle frame arrangement of claim 11, wherein the energy storage system comprises at least one hydrogen tank.

* * * * *